(12) United States Patent
Benthien

(10) Patent No.: US 11,186,369 B2
(45) Date of Patent: Nov. 30, 2021

(54) PIVOTABLE LUGGAGE LOCKER, AND VEHICLE HAVING A LUGGAGE LOCKER

(71) Applicant: Airbus Operations GmbH, Hamburg (DE)

(72) Inventor: Hermann Benthien, Sottrum (DE)

(73) Assignee: Airbus Operations GmbH, Hamburg (DE)

(*) Notice: Subject to any disclaimer, the term of this patent is extended or adjusted under 35 U.S.C. 154(b) by 593 days.

(21) Appl. No.: 16/143,091

(22) Filed: Sep. 26, 2018

(65) Prior Publication Data

US 2019/0092473 A1 Mar. 28, 2019

(30) Foreign Application Priority Data

Sep. 27, 2017 (DE) ..................... 10 2017 217 216.9

(51) Int. Cl.
*B64D 11/00* (2006.01)
*B60R 5/00* (2006.01)
*B60R 7/08* (2006.01)

(52) U.S. Cl.
CPC .............. *B64D 11/003* (2013.01); *B60R 5/00* (2013.01); *B60R 5/003* (2013.01); *B60R 7/08* (2013.01)

(58) Field of Classification Search
CPC .. B64D 11/003; B60R 5/003; E05Y 2900/502
USPC .................................................. 224/282, 311
See application file for complete search history.

(56) References Cited

U.S. PATENT DOCUMENTS

| 1,659,929 | A | * | 2/1928 | Trout | ...................... | B60R 11/06 |
| | | | | | | 414/462 |
| 4,275,942 | A | | 6/1981 | Steidl | | |
| 4,630,857 | A | * | 12/1986 | Zweiniger | ................. | B60R 7/06 |
| | | | | | | 224/282 |
| 5,829,813 | A | * | 11/1998 | LaValle | ..................... | B60R 7/04 |
| | | | | | | 296/37.6 |
| 6,045,204 | A | | 4/2000 | Frazier et al. | | |
| 6,484,969 | B2 | * | 11/2002 | Sprenger | .............. | B64D 11/003 |
| | | | | | | 244/118.1 |
| 7,726,606 | B2 | * | 6/2010 | Graf | ..................... | B64D 11/003 |
| | | | | | | 244/118.5 |

(Continued)

FOREIGN PATENT DOCUMENTS

| AT | 410 536 B | 5/2003 |
| DE | 10 2007 059 686 A1 | 6/2009 |

OTHER PUBLICATIONS

German Search Report for German Application No. 10 2017 217 216.9 dated Jun. 12, 2018.

*Primary Examiner* — Adam J Waggenspack
(74) *Attorney, Agent, or Firm* — Jenkins, Wilson, Taylor & Hunt, P.A.

(57) ABSTRACT

A pivotable luggage locker for a vehicle, the luggage locker including a luggage compartment which has a bottom and the rear wall, and a first holder. The first holder is attached on an outer side of the rear wall and is set up to hold the luggage compartment rotatably. In addition, the luggage locker includes a second holder which is attached in a region of an upper side of the luggage compartment, and an actuating mechanism which is coupled rotatably to the luggage compartment on the second holder and is set up to rotate the luggage compartment about the first holder. Furthermore, a vehicle having a pivotable luggage locker of this type is disclosed.

13 Claims, 7 Drawing Sheets

(56) References Cited

U.S. PATENT DOCUMENTS

| | | | |
|---|---|---|---|
| 7,887,008 B2* | 2/2011 | Lamoree | B64D 11/003 |
| | | | 244/118.1 |
| 8,919,695 B2* | 12/2014 | Bock | B64D 11/003 |
| | | | 244/118.5 |
| 9,308,996 B2* | 4/2016 | Schneider | B64D 11/003 |

* cited by examiner

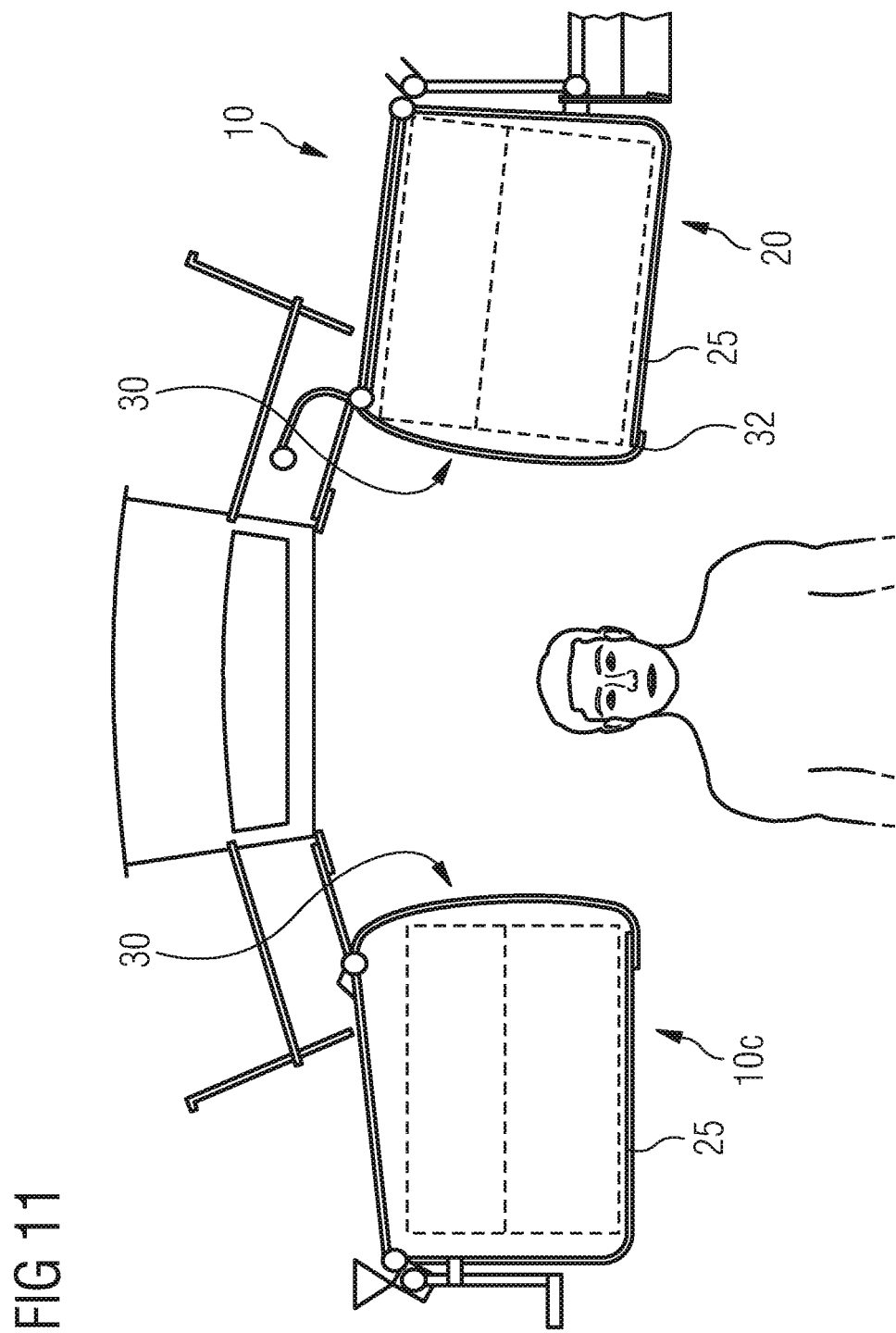

PIVOTABLE LUGGAGE LOCKER, AND VEHICLE HAVING A LUGGAGE LOCKER

CROSS-REFERENCE TO RELATED APPLICATION

This application claims priority to German Patent Application No. DE 10 2017 217 216.9 filed Sep. 27, 2017, the entire disclosure of which is incorporated by reference herein.

TECHNICAL FIELD

The disclosure herein relates to a pivotable luggage locker for a vehicle, and to a vehicle having a luggage locker of this type. More particularly, the disclosure herein relates to a pivotable luggage locker having a holder which is attached on an outer side of a rear wall of the luggage locker.

BACKGROUND

Current luggage lockers in vehicles, in particular luggage lockers which are situated in a ceiling region of the vehicle, can be divided into fixed luggage lockers and pivotable luggage lockers.

The fixed luggage lockers are closed and opened by way of a flap which is attached on the front side and usually opens towards the ceiling of the vehicle, in order to make the access to the stowage space of the luggage locker simple. Although fixed luggage lockers have a fixedly defined stowage space which can be adapted and can be optimized to surrounding components of the vehicle, the stowage space is more difficult to access and/or look into because of the fixedly installed bottom.

In contrast, the pivotable luggage lockers are mounted rotatably on side walls thereof, with the result that the stowage space becomes accessible by way of downward pivoting of the luggage locker. FIGS. 1 and 2 show diagrammatic cross sections of a conventional pivotable luggage locker 100. The luggage locker 100 has a tub-shaped element 101 which is mounted such that it can be rotated about a pivot axis 103. The pivot axis 103 can run through corresponding joints in the side walls (not shown) of the luggage locker. In the open state which is shown in FIG. 1, the tub-shaped element 101 is spaced apart from a top element 102 on its front side, as a result of which an opening into the stowage space of the luggage locker 100 is formed. In the closed state which is shown in FIG. 2, the front side or front edge of the tub-shaped element 101 terminates flush on the top element 102, with the result that the stowage space of the luggage locker 100 is closed and no objects can fall out of it.

The mounting on the side walls affords the advantage that the pivot axis 103 of the luggage locker 100 is arranged above the centroid of the (loaded) tub-shaped element 101, as a result of which the opening and closing of the tub-shaped element 101 is possible with relatively low effort. As can be seen in a comparison of FIGS. 1 and 2, the available stowage space of the luggage locker 100 is greater in the open state (FIG. 1). Although this facilitates the inserting of a luggage item 110 into the stowage space, the luggage item 110 is moved upwards (in the direction of the top element 102) together with the tub-shaped element 101 during the closing of the luggage locker 100 (FIG. 2), with the result that the luggage item 110 might come into contact with the top element 102. Here, the luggage item 110 might be damaged and/or the closing of the luggage locker 100 might be prevented.

SUMMARY

The disclosure herein is therefore based on an object of providing a luggage locker which can be operated easily and has as large a stowage space as possible.

For this purpose, a pivotable luggage locker for a vehicle is provided, which pivotable luggage locker comprises a luggage compartment which has a bottom and a rear wall. Furthermore, the luggage locker comprises a first holder which is attached on an outer side of the rear wall and is set up or configured to hold the luggage compartment rotatably.

As a result of the arrangement of the holder on an outer side of the rear wall, it is possible to distribute the loads of the luggage locker to a larger area than is the case in the event of mounting of the luggage locker on its side faces. In the case of the luggage lockers which are mounted on the side faces, the overall weight of each luggage locker can be absorbed and transmitted into the structure of the vehicle only at two points (the laterally arranged joints). In contrast to the point bearings, a holder which is arranged on the outer side of the rear wall can utilize the entire width of the rear wall (in the viewing direction through the opening of the luggage locker towards the rear wall). As a result, the loads which act on the structure of the vehicle and, in particular, torques which are produced by way of the weight of the luggage locker can be reduced.

Furthermore, the production of the luggage locker components is simplified by way of the arrangement of the holder on the outer side of the rear wall. For example, it has been necessary up to now for the load-bearing side walls of the luggage locker to be of thicker configuration and for openings or indentations to be provided for receiving the holder (for example, joints). Openings of this type have been milled into the side walls, which signified an increased time requirement during the production of the luggage locker. The configuration of the luggage locker disclosed herein simplifies the production of the luggage locker not only as a result of the lower material costs, but rather also as a result of the omission of additional work steps. The attachment of the holder on the outer side of the rear wall is at least considerably simpler and more rapid to bring about than the milling of openings or the production of side walls with special receptacles for joints and other holders.

Here, the terms top, bottom, front, front side, rear wall, rear side, bottom, etc. relate to the respective sections of the luggage locker and its components in the state, in which they are installed in the vehicle. Thus, an upper side or an upper region of the luggage locker or one of its components faces the vehicle ceiling, whereas a lower region or the bottom is arranged on a side which faces away from the ceiling of the vehicle. This likewise applies to a rear wall, rear side or region which is arranged at the rear, which lies opposite an access opening of the luggage locker on a front side of the luggage locker and extends from the upper region to the lower region of the luggage locker.

A vehicle is a motor vehicle (including passenger motor vehicles, lorries and buses) or an aircraft, or else other means of mass transportation, such as trains or ships. For example, a pivotable luggage locker can be arranged at any desired point in the vehicle. A multiplicity of luggage lockers can likewise be arranged next to one another in the vehicle, for example along an aisle in the vehicle, the luggage lockers all having an opening which faces the aisle of the vehicle and a rear wall which faces away from the aisle of the vehicle. Likewise by way of example, the luggage lockers can be arranged along a longitudinal axis of the vehicle (for example, in the case of aircraft, trains or buses), along which longitudinal axis a passenger aisle also runs, with the result that their rear walls are arranged parallel to the longitudinal axis of the vehicle.

Furthermore, the luggage locker can comprise a second holder which is attached in a region of an upper side of the luggage compartment, and an actuating mechanism, the actuating mechanism being coupled rotatably to the luggage compartment on the second holder and being set up to rotate the luggage compartment about the first holder. Here, the second holder can serve merely to connect the actuating mechanism. In addition, the second holder can also transmit loads of the luggage locker at least proportionately to the actuating mechanism. Primarily, a movement of the actuating mechanism brings about a rotation of the luggage compartment about the first holder. Here, both the rear wall and the bottom of the luggage compartment are pivoted about the first holder. In particular, in the case of a rotation of the luggage compartment, in the case of which an end of the bottom which lies opposite the rear wall is moved downwards, simple access to the stowage space which is provided by way of the luggage compartment is brought about.

In one design variant, the first holder can comprise a plurality of hinges which are attached on the outer side of the rear wall. The weight of the luggage locker can be distributed to a plurality of bearing points by way of a multiplicity of hinges (joints). As an alternative, the first holder can be configured in the form of one or more piano hinges (also called a hinge band), and can extend over substantially the entire width of the rear wall. In each of the designs, the loads which are produced by way of the weight of the luggage locker can be introduced into the structure of the vehicle in an improved manner, since they can be distributed over a larger section of the vehicle. In particular, in the case of the arrangement of the luggage locker along a longitudinal axis of the vehicle, torques which are produced in the case of an acceleration and deceleration of the vehicle can be reduced or completely avoided here. This is advantageous, in particular, in comparison with the conventional luggage lockers which are mounted on the side walls and in the case of which high torques are introduced into the vehicle structure during the acceleration and deceleration of the vehicle (both in the longitudinal direction and in the transverse direction of the vehicle) in a manner which is dependent on the spacing of the side walls from one another and in a manner which is dependent on the spacing of the lateral links from the vehicle structure.

In another design variant, the actuating mechanism can comprise a front element which is set up to at least partially close the luggage compartment on a side which lies opposite the rear wall, and a third holder, on which the front element is held rotatably. Furthermore, the actuating mechanism can comprise a fourth holder which is attached on the front element on a side which faces the luggage compartment, and a connecting element which is arranged between the second holder and the fourth holder. Here, the second and fourth holder are set up to hold the connecting element in each case rotatably. In this design variant, the connecting element can transmit loads of the luggage locker into the front element, it being possible in turn for the latter to forward the loads via the third holder, for example into the structure of the vehicle.

Because of the rotatable third holder, a rotational movement of the front element can be transmitted via the connecting element as a substantially linear movement to the second holder, and therefore to the luggage compartment of the luggage locker. For example, in the case of a rotational movement of the front element, the connecting element can rotate the luggage compartment around the first holder. It is therefore possible to rotate that region of the luggage compartment, on which the second holder is arranged, towards the front element and about the first holder during opening of the luggage compartment (by way of a rotational movement of the front element away from the luggage compartment). Here, the bottom of the luggage compartment is moved downwards in the region of the front element. In this way, the access to the luggage compartment during opening of the front element is facilitated.

In accordance with one refinement, the fourth holder can be arranged on the front element in such a way that a spacing between the third holder and the fourth holder is smaller than a spacing between the fourth holder and a side of the front element, which side faces the bottom (lower side of the front element). The spacing which is therefore greater between the fourth holder and the lower side of the front element forms a greater lever arm about the third holder than is the case for the fourth holder. In this way, the front element can be rotated by way of a small effort, and at the same time the luggage compartment can be moved around the first holder.

For example, a handle or a recessed grip can be arranged on the lower side of the front element. This makes it possible for a user of the luggage locker to move the lower side of the front element towards the ceiling of the vehicle with as great a lever arm as possible, the front side of the luggage compartment also at the same time being moved downwards via the connecting element for facilitated access. Accordingly, the user can close the front element with a great lever arm (can move it in the direction of the luggage compartment), the great lever arm also facilitating the rotation of the luggage compartment about the first holder and therefore lifting of the luggage compartment and the inserted luggage.

In a further design variant, the front element can have an end section (lower side of the front element) which faces the bottom, the end section being set up to engage under the bottom and to hold it in a positively locking manner in the case of a rotational movement of the front element towards the luggage compartment. In other words, on its lower side, the front element has a section which faces the bottom. In the case of the rotational movement of the front element towards the bottom, the lower-side section engages under the bottom, with the result that the bottom can be held in a positively locking manner on the lower-side section. As a result, in the closed state of the luggage locker, the bottom is supported (mounted) on its front side by way of the front element and the third holder, whereas it forms a cantilever arm in the open state.

A lock can optionally be arranged on the lower-side section of the front element, which lock interacts with a corresponding locking element of the bottom, in order to prevent a release of the front element from the bottom. Accordingly, the lock can be released by way of the user, in order to make opening of the front element and releasing of the bottom possible.

One refinement of the front element can provide that the front element extends substantially in one plane from the third holder to a side of the front element (lower side of the front element), which side faces the bottom. In other words, the front element forms a planar surface and/or has a linear course in a cross section. As a result, a simple transmission of force by way of the front element can take place. In addition, the production of the front element and its installation into the luggage locker are simplified.

As an alternative, the front element can be of substantially concave configuration between the third holder and the fourth holder. Here, in the case of a viewing direction towards the front element, concave can be understood to mean in the direction of the rear wall of the luggage compartment (for example the view of the front element from an aisle of the vehicle). In other words, a cross section of the front element runs from the third holder first of all in the direction of the rear wall of the luggage compartment and subsequently again in the direction of the front side of the luggage compartment as far as the fourth holder. As a result, the section of the front element can interact in an improved manner with a top element of the vehicle, which top element conceals the view of the third holder, without the third holder or structural elements of the vehicle becoming visible in the case of the movement of the front element. In addition, additional space in the form of a niche is provided on the front side of the luggage locker, as a result of which the vehicle interior space in the ceiling region appears larger.

As an alternative or in addition, the front element can be of substantially convex configuration between the fourth holder and a side of the front element (lower side of the front element), which side faces the bottom. Here, convex relates to a viewing direction towards the front element in the direction of the rear wall of the luggage compartment. In other words, the cross section of the front element runs from the fourth holder first of all away from the rear wall of the luggage compartment and subsequently again in the direction of the rear wall and/or the bottom of the luggage compartment. A greater stowage space of the luggage locker can be provided by way of the shape of the front element, the visual impression of the luggage locker not reflecting the increased stowage space because of the lower side and upper side of the front element which run closer to the rear wall of the luggage compartment.

In a further design variant, the fourth holder can lie closer to the second holder than the third holder when the front element at least partially closes the luggage compartment on the side which lies opposite the rear wall. In other words, the connecting element which is arranged between the second and fourth holder is shorter than the depth of the stowage space of the luggage locker. As a result of the arrangement, the component group consisting of or comprising the connecting element, the fourth holder and the section of the front element between the third and fourth holder is more compact; in particular, the component group has a lower overall height, as a result of which the luggage locker can be fastened closer to the ceiling of the vehicle and takes up less space in the interior of the vehicle. In addition, for example, the concave and/or convex course of the front element can be boosted, as a result of which the luggage locker seems visually smaller (in the vertical direction).

In a further design variant, the front element can be of two-piece configuration in a region between the fourth holder and a side of the front element (lower side of the front element), which side faces the bottom. Here, that part of the two-piece front element which faces the bottom can be fastened rotatably by way of a fifth holder to that part of the front element which faces the fourth holder. This permits a space-saving arrangement of the front element when it has been rotated about the third holder away from the luggage compartment. In particular, the lower side of the front element protrudes to a lesser extent into the ceiling region of the interior of the vehicle, since the second part (lower part) of the front element can be rotated upwards or downwards relative to the first part (upper part) of the front element about the fifth holder. This makes a free ceiling region in the interior of the vehicle possible, which free ceiling region can be utilized for the passage of passengers, as a result of which the ceiling height in the vehicle does not have to be increased.

In accordance with one refinement, the third holder can comprise a plurality of hinges. For example, two hinges can fasten the front element rotatably to the structure of the vehicle. It goes without saying that any desired number of hinges can be used for attaching the front element to the structure of the vehicle. For example, the number of hinges can correspond to a number of structural elements of the vehicle, such as ribs or frames which are spanned by the front element, one hinge being arranged on each structural element.

As an alternative to this, the third holder can be configured in the form of one or more piano hinges. The piano hinge or hinges can be distributed substantially over the entire width of the front element or can extend over substantially the entire width of the front element. As a result of the use of piano hinges, a uniform load input from the front element into the structure of the vehicle can be brought about.

Piano hinges which are used as a first or third holder can also be fastened to an installation rail which is in turn fastened to the structural elements of the vehicle, such as ribs or frames. It is therefore possible to achieve a uniform load input into the installation rail via the piano hinges.

In accordance with another design variant, a spacing between the first holder and a side of the rear wall (lower side of the rear wall), which side faces the bottom, can be smaller than a spacing between the first holder and the second holder. Since the luggage compartment is held rotatably on the first holder, the section of the rear wall between the first holder and the second holder forms a greater lever arm than the remaining section of the rear wall between the first holder and the lower side of the rear wall. As a result of the greater lever arm, the force which is introduced by the connecting element into the second holder for opening and closing the luggage compartment can be smaller. In the case of different lever arms of the front element in relation to the fourth holder, a double transmission of the force which is applied on the lower side of the front element for moving the luggage compartment can therefore be brought about.

Furthermore, each rotational axis of the holders can extend substantially parallel to a plane which is formed by way of the bottom. In other words, all rotational axes of the holders run parallel to one another and also parallel to the bottom of the luggage compartment. If a cross section of the luggage locker is considered, all rotational axes of the holders run perpendicularly with respect to the sectional plane of the cross section of the luggage locker.

In a further design variant, the luggage locker comprises a top element which is attached in the region of the upper side of the luggage compartment and extends substantially parallel to the bottom. It goes without saying that the top element can also be arranged at an angle with respect to the bottom, for example such that the top element and the bottom run towards one another in the direction of the rear wall. The top element delimits or defines the stowage space of the luggage locker in the upward direction and therefore prevents luggage items or parts thereof from influencing or damaging the actuating mechanism.

Here, the second holder can be attached on the top element. As a result, the connecting element can be shortened and can be arranged in a compact manner on the top element in the closed state of the luggage locker. As an alternative, the second holder can also be attached at a connecting point between the top element and the rear wall.

In another design variant, the bottom has an edge on its side which faces the front element. The edge protects luggage items against falling out, in particular if the luggage compartment is rotated about the first holder and the bottom is arranged in an oblique manner. For example, the edge can be formed by virtue of the fact that the bottom has an upwardly curved end section.

In yet a further design variant, the luggage compartment is fastened to the first holder in such a way that it can be rotated about the first holder between a basic position and an open position. Here, in the basic position, the bottom is arranged either horizontally or is arranged in an inclined manner, with the result that a front side of the bottom lies at a higher level than that side of the bottom, on which the rear wall of the luggage compartment is situated. The latter prevents luggage items from falling out precisely at the beginning of the opening operation, that is to say before a passenger can see into the luggage compartment. In addition, the front side of the bottom and therefore of the luggage locker is arranged at a higher level in the interior of the vehicle than in the case of a horizontally oriented bottom, as a result of which the luggage locker takes up less space in the interior of the vehicle. This can be utilized in a particularly advantageous manner if the ceiling region of the vehicle does not run horizontally in the cross section of the vehicle. For example, the ceiling regions are of elliptical or round configuration in aircraft and trains. Here, the position of the luggage compartment in the basic position (or closed position) can be adapted to the elliptical or round course.

In the open position, in contrast, the bottom can be arranged in an inclined manner such that the front side of the bottom lies at a lower level than that side of the bottom, on which the rear wall of the luggage compartment is situated. This facilitates insertion of a luggage item into the luggage compartment and viewing of the stowage space of the luggage compartment.

In accordance with a further aspect, a vehicle comprises a luggage locker according to one of the above-described refinements and variants.

The refinements, variants and aspects which are described herein can be combined in any desired manner, with the result that further design variants which are not described explicitly are formed.

BRIEF DESCRIPTION OF THE DRAWINGS

In the following text, exemplary embodiments of the disclosure herein will be described in greater detail using the drawings, in which:

FIG. 11 diagrammatically shows the arrangement of the variant from FIG. 9 in a vehicle cross section.

DETAILED DESCRIPTION

In accordance with the disclosure herein, a luggage locker which is easy to operate and has as much stowage space as possible is provided, and a vehicle having a luggage locker of this type is described.

Figure 3:
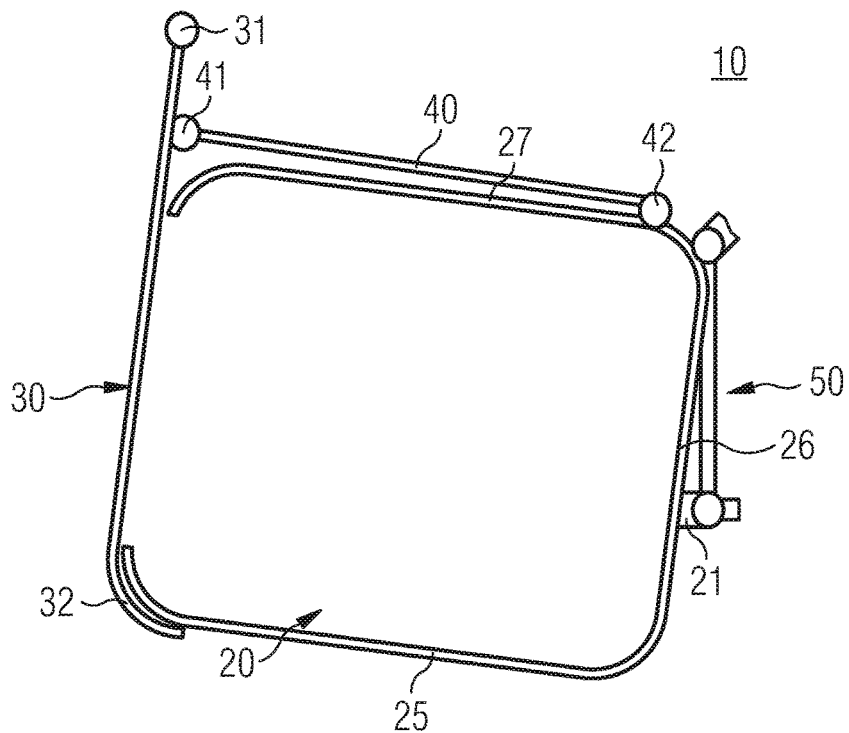
FIG. 3 diagrammatically shows a cross section of one variant of a luggage locker in the closed state.

FIG. 3 diagrammatically shows a cross section of one variant of a pivotable luggage locker 10 of this type. The luggage locker 10 comprises a luggage compartment 20 which in turn consists of or comprises a bottom 25 and a rear wall 26. The bottom 25 serves as a support for luggage items, that is to say defines the stowage space of the luggage locker 10 on its lower side. The rear wall 26 defines the stowage space of the luggage locker 10 on its rear side and adjoins a holding structure 50 of the vehicle which serves to hold further components (not described in greater detail here) in the vehicle.

The luggage compartment 20 is held rotatably on a first holder 21 of the luggage locker 10. Here, the first holder 21 is attached to an outer side of the rear wall 26, that is to say the rear wall 26 is coupled to the first holder 21. The outer side of the rear wall 26 is that side of the rear wall 26 which faces away from the stowage space of the luggage compartment 20. The first holder 21 can be fastened, for example, to the holding structure 50 of the vehicle.

Furthermore, the luggage locker 10 comprises a second holder 42 which is attached in a region of an upper side of the luggage compartment 20. FIG. 3 shows the second holder 42 in such a way that it is arranged on an upper side of the rear wall 26. It goes without saying that the second holder 42 can be arranged in any desired region of the luggage compartment above the first holder 21.

The luggage compartment 20 can additionally comprise a top element 27 which is attached in the region of the upper side of the luggage compartment 20 and extends substantially parallel to the bottom 25. The luggage compartment 20 can be produced in one piece, with the result that the bottom 25, the rear wall 26 and the top element 27 consist of one piece. As an alternative, the bottom 25, the rear wall 26 and the top element 27 can also be joined together.

Furthermore, the pivotable luggage locker 10 comprises an actuating mechanism 40 which is coupled rotatably to the luggage compartment 20 on the second holder 42. In other words, the actuating mechanism 40 is fastened to the second holder 42, the second holder 42 making a rotation of the luggage compartment 20 relative to the actuating mechanism 40 possible. Furthermore, the actuating mechanism 40 is set up or configured to rotate the luggage compartment 20 about the first holder 21. The actuating mechanism 40 can be a rod or plate which is resistant to shear loads. The actuating mechanism 40 extends substantially in the same direction as the bottom 25, it being possible for the actuating mechanism 40 to run parallel to the bottom 25, but it likewise also being possible for it to form an angle with the plane which is defined by way of the bottom 25. In particular, the angle is dependent on the position of the actuating mechanism 40 relative to the luggage compartment 20.

For example, the actuating mechanism 40 can have a handle at its front end 41, by way of which handle the actuating mechanism 40 is moved within the plane of the drawing of FIG. 3, as a result of which the luggage compartment 20 is rotated. As an alternative or in addition, the actuating mechanism 40 can also comprise a motor (not shown) or another aid, by way of which the actuating mechanism 40 is moved and the luggage compartment 20 is rotated.

The luggage locker 10 can additionally comprise a front element 30 which is set up to at least partially close the luggage compartment 20 on a side which lies opposite the rear wall 26. FIG. 3 shows the front element 30 in such a way that it overlaps the bottom 25, that is to say completely closes an opening which is present between the bottom 25 and the top element 27. In the overlap region, the front element 30 has an end section 32 which faces the bottom 25. The end section 32 is set up to engage under the bottom 25 and to hold it in a positively locking manner.

As an alternative, the front element 30 can be dimensioned in such a way that it terminates flush with the front edge of the bottom 25 (that is to say, that edge of the bottom 25 which defines the lower side of the opening of the luggage locker 10) and reliably closes the stowage space of the luggage locker 10 in the closed state (FIG. 3) of the luggage locker 10.

The front element 30 is held rotatably by way of a third holder 31. The third holder 31 can be fastened to a structural element of the vehicle or a holding structure of the vehicle which is provided for this purpose, and can permit a rotatable coupling to the front element 30.

Furthermore, a fourth holder 41 can be attached on a side of the front element 30, which side faces the luggage compartment 20. A connecting element 40 (for example, a rod or plate) which forms the actuating mechanism is attached between the second holder 42 and the fourth holder 41. Here, the second and fourth holder 41, 42 can be set up to hold the connecting element 40 in each case rotatably. As an alternative, the second holder 42 and the fourth holder 41 are arranged fixedly on the connecting element 40, the luggage compartment 20 and the front element 30 in each case being fastened rotatably to the respective holder 42, 41.

Figure 4:
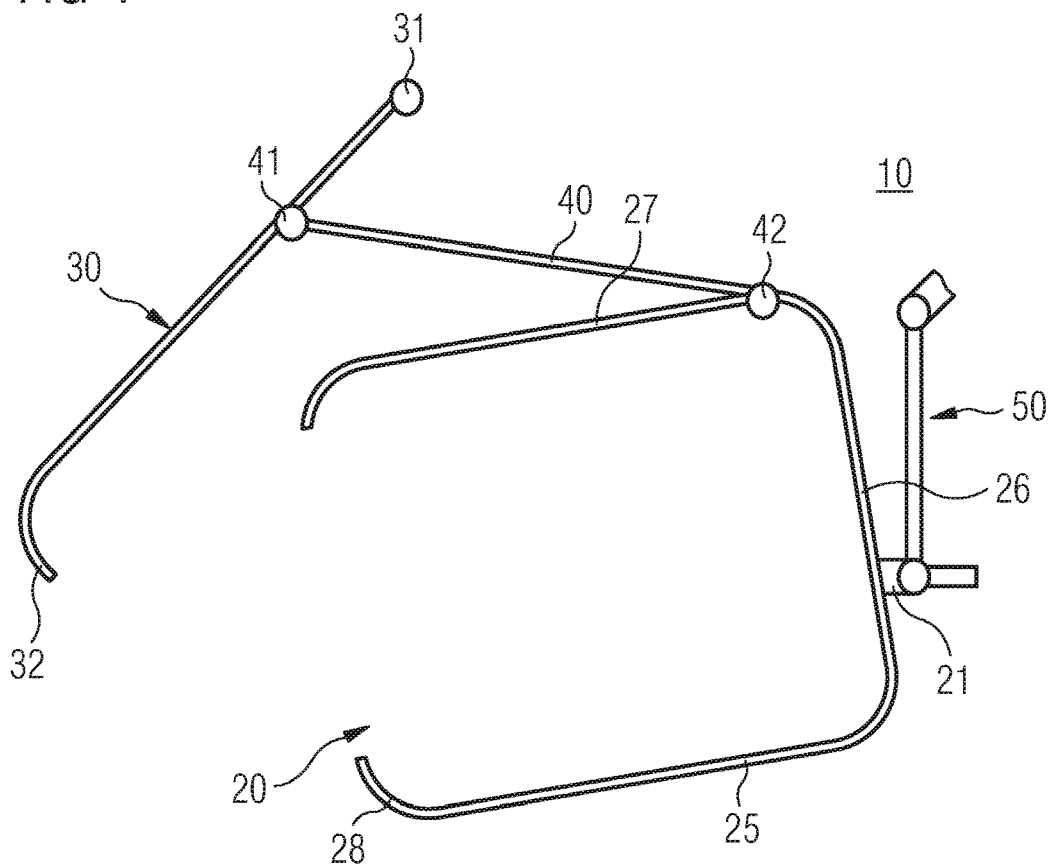
FIG. 4 diagrammatically shows a cross section of the variant from FIG. 3 in the open state.

As can be gathered from FIG. 4, the connecting element 40 (at least sections thereof) is likewise guided around the third holder 31 by way of a rotation of the front element 30 about the third holder 31. As a result of the coupling to the luggage compartment 20 on the second holder 42, the luggage compartment 20 is rotated around the first holder 21 as a result of the movement of the front element 30. Here, movements in opposite directions of the front element 30 and the luggage compartment 20 are produced, as a result of which access into the stowage space of the luggage locker 10 is made possible rapidly. As a result of the rotation of the luggage compartment 20, a front side of the bottom 20 moving downwards, not only is the access into the stowage space of the luggage locker 10 improved, but also the view into the stowage space, while at the same time the front element 30 is moved away from the opening into the stowage space of the luggage locker 10.

The rotational axes of all holders 21, 31, 41, 42 run parallel to one another, in order to bring about a friction-free opening and closing operation of the luggage locker. The first and third holder 21, 31 can extend over the entire width of the luggage locker 10 (perpendicularly with respect to the plane of the drawing of FIGS. 3 and 4). For example, the first and third holders 21, 31 can be implemented in the form of piano hinges. The second and fourth holder 42, 41 and the actuating mechanism and the connecting element 40 can be restricted to two holders and a single connecting rod. Weight can be saved as a result. For an improved rotation of the luggage compartment 20, the attachment of at least two connecting elements 40 with associated holders 42, 41 is advantageous, since the possibility of tilting of the front element 30 and/or of the luggage compartment 20 is reduced as a result.

FIG. 3 (the closed position of the luggage locker 10) shows the luggage compartment 20 tilted rearwards. In other words, during the closing of the front element 30 onto the opening into the stowage space of the luggage locker 10, the luggage compartment 20 assumes a position relative to the first holder 21 or the holding structure 50 of the vehicle, in the case of which position the bottom 25 has a downward inclination towards the rear wall 26. This reduces an interaction of luggage items in the luggage compartment 20 with the front element 30 in its closed position. The front element 30 can therefore be pressed open from the inside by a luggage item in the luggage compartment 20 only with difficulty.

As an alternative, in the closed position of the front element 30, the luggage compartment 20 can be arranged in such a way that the bottom 25 is oriented in a substantially horizontal manner. A corresponding horizontal arrangement of the luggage compartment 20 is shown in the variant in accordance with FIG. 5. This arrangement provides a horizontally running lower side of the luggage locker 10, which lower side can form, for example, a ceiling region in the interior of the vehicle. A horizontally running the ceiling region is visually advantageous, for example, if the luggage locker 10 is situated above passenger seats in the vehicle. The horizontally running bottom 25 can likewise also be provided when a ceiling region of the vehicle does not permit an elevated position of the top element 27 in the case of an inclined position of the luggage compartment 20 and therefore an inclined position of the top element 27.

Figure 5:
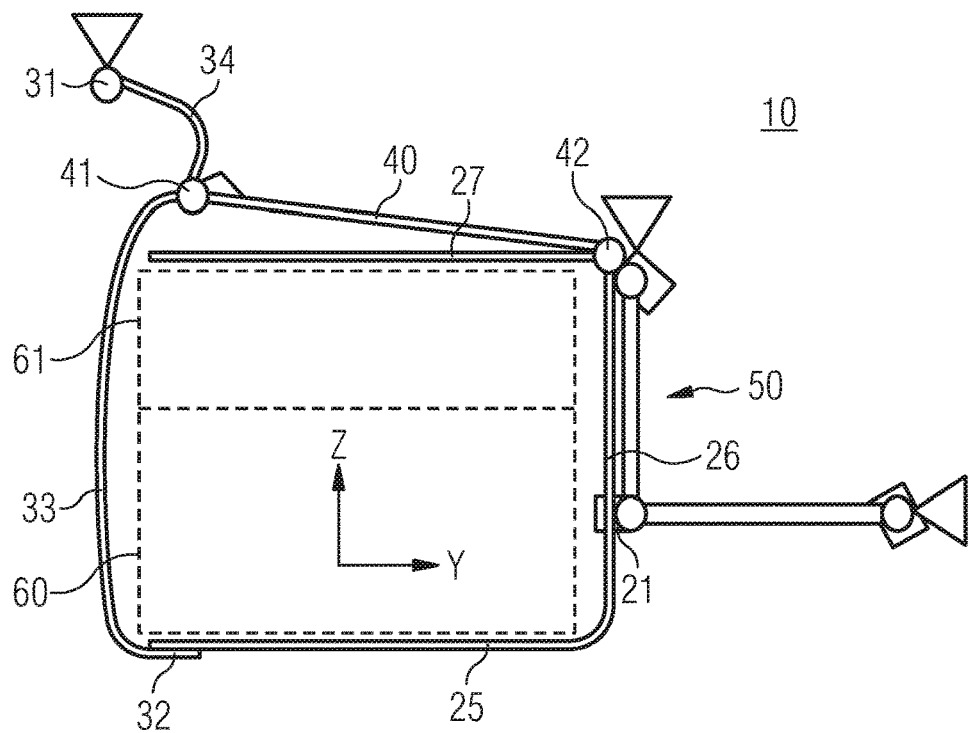
FIG. 5 diagrammatically shows a cross section of a further variant of a luggage locker in the closed state.
Figure 6:
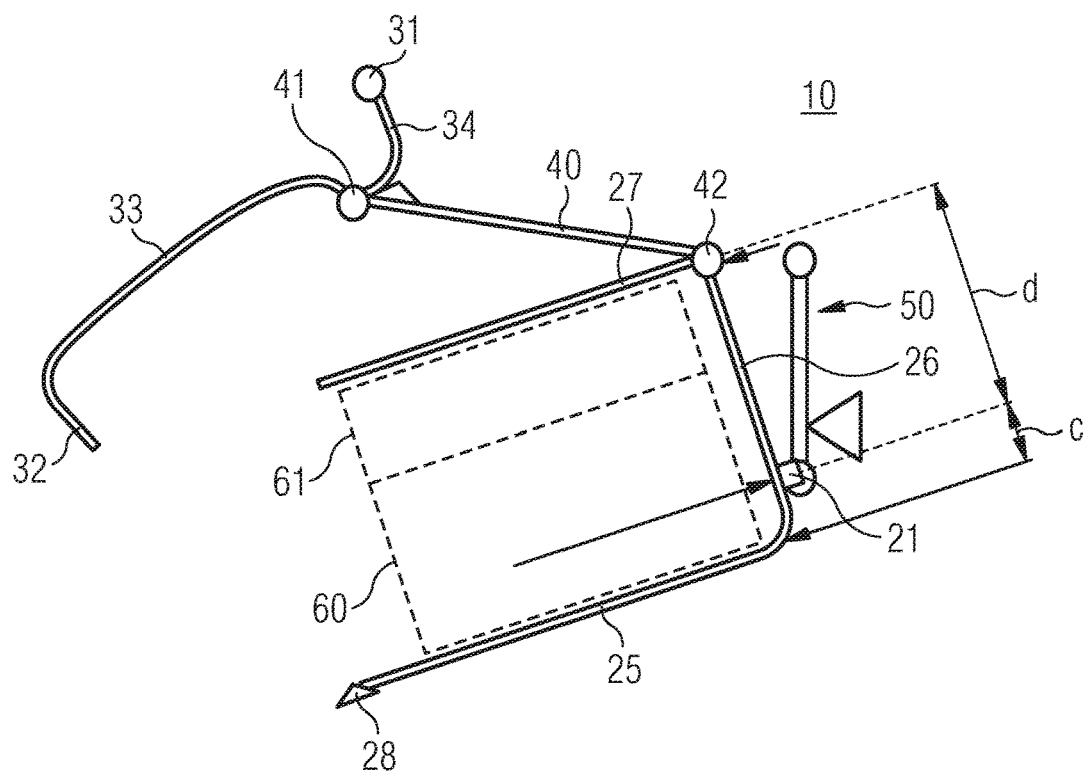
FIG. 6 diagrammatically shows a cross section of the variant from FIG. 5 in the open state.

As a result of the arrangement of the luggage compartment 20 which is shown in FIG. 5, the front edge of the luggage compartment 20 in the open position of the front element 30 lies further to the bottom, in comparison with the variant from FIG. 4, as shown in FIG. 6, as a result of which the insertion of luggage items into the luggage compartment 20 is facilitated. In order to prevent luggage items from falling out of the luggage compartment 20 in the open position of the front element 30, a holding element 28 can be arranged on a front edge of the bottom 25. In one optional refinement, the holding element 28 can be set up to be pushed out of the front edge of the bottom 25 as a result of the rearward movement of the rear side of the bottom 25 in the case of the rotation about the first holder 21. For example, an element (not shown) which is fixedly fastened to the first holder 21 or the holding structure 50 can push an element forwards, which element runs in the bottom 25 and is connected to the holding element 28, while the luggage compartment 20 is rotating about the first holder 21 into the open position.

Furthermore, that variant of the luggage locker 10 which is shown in FIGS. 5 and 6 has a front element 30 with a concave and convex course, whereas, in the case of the variant according to FIGS. 3 and 4, the front element 30 extends substantially in one plane from the third holder 31 to a side of the front element 30, which side faces the bottom 25. The clear span of the ceiling of the vehicle interior becomes greater as a result of the concave section 34 of the front element 30 between the third holder 31 and the fourth holder 41, as a result of which the interior of the vehicle appears larger. The convex section 33 of the front element 30 between the fourth holder 41 and that side of the front element 30 which faces the bottom 25 provides additional stowage space within the luggage locker 10.

Figure 1:
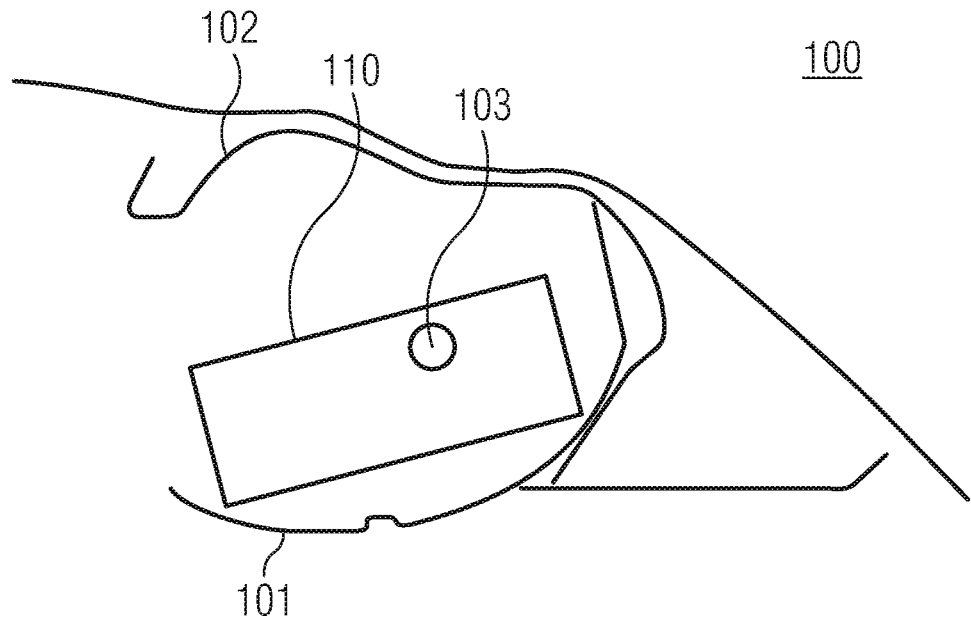
FIG. 1 diagrammatically shows a cross section of a conventional open luggage locker.
Figure 2:
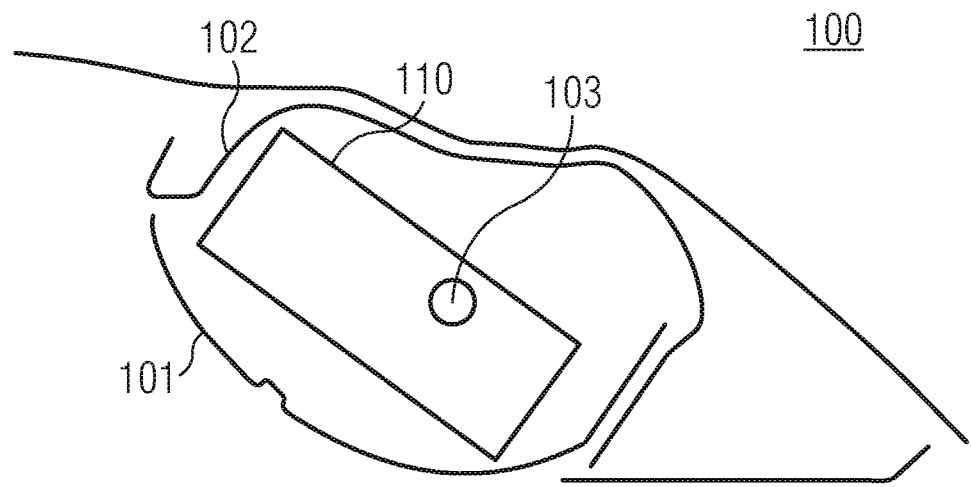
FIG. 2 diagrammatically shows a cross section of a conventional closed luggage locker.

FIG. 5 shows the stowage space for luggage items using dashed lines. Here, a first region 60 of the stowage space corresponds approximately to the size of a luggage item 110 from a conventional pivotable luggage locker 100 (FIGS. 1 and 2). As can be seen from a comparison of FIGS. 1 to 6, the luggage locker 10 in accordance with the disclosure herein provides an additional stowage space region 61 which can be utilized completely for luggage items. The additional stowage space region 61 is produced by virtue of the fact that the entire luggage compartment 20 is rotated about the holder 21.

In addition, FIG. 6 shows lever arms c and d which are defined by way of the first holder 21. The lever arm c relates to the spacing of the bottom 25 from the holder 21, whereas the lever arm d reflects the spacing of the second holder 42 from the first holder 21. By virtue of the fact that the lever arm d is greater than the lever arm c, the actuating mechanism or the connecting element 40 can bring about the rotational movement of the luggage compartment 20 around the first holder 21 more easily. In other words, the force which is to be applied by the user is lower than is the case in conventional luggage lockers (see FIGS. 1 and 2).

Figure 7:
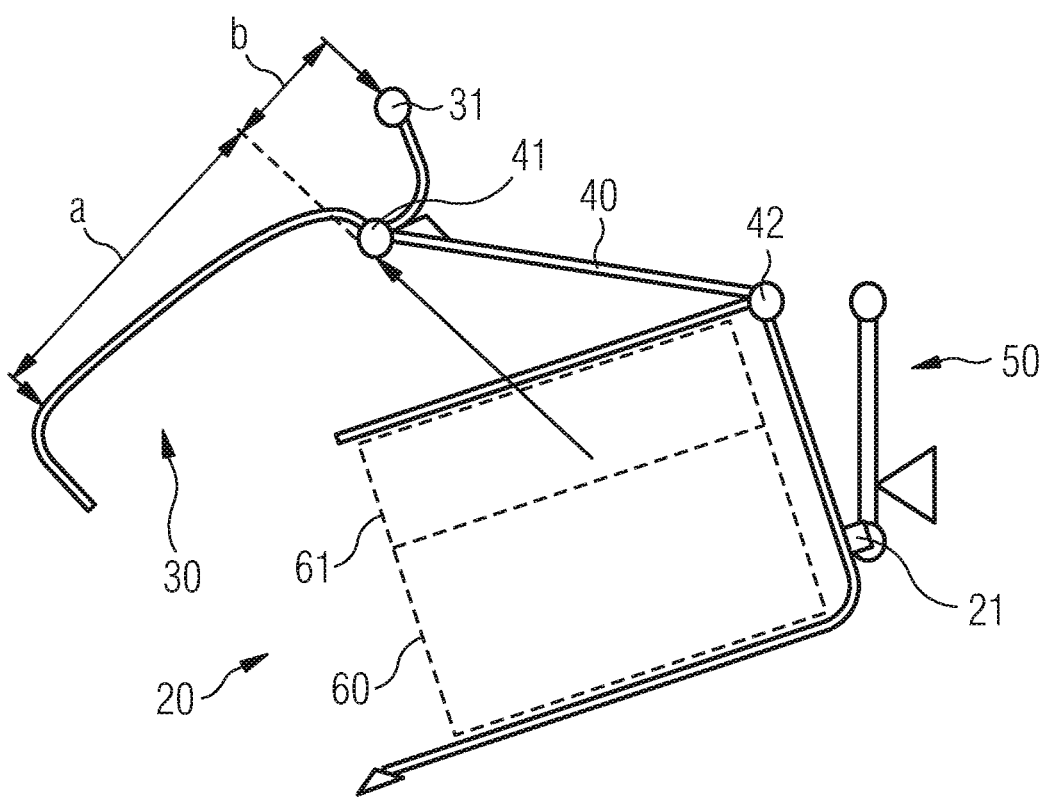
FIG. 7 diagrammatically shows a lever arm ratio of the variant from FIG. 5 in the open state.

A further reduction of the force which is to be applied by the user is achieved by way of corresponding lever arms in the front element 30, as shown in FIG. 7. Here, a lever arm a corresponds to the standardized spacing between the fourth holder 41 and a lower edge of the front element 30, whereas a lever arm b corresponds to the standardized spacing between the fourth holder 41 and the third holder 31. Here, in order to standardize the spacings, a connecting axis between the third holder 31 and the lower edge of the front element 30 can be used. If the lever arm a is selected to be greater than the lever arm b, as shown in FIGS. 3 to 7, a transmission takes place of a force which is applied to the lower edge of the front element 30 for opening and closing the front element 30 to the fourth holder 41 and therefore to the connecting element 40.

Figure 8:
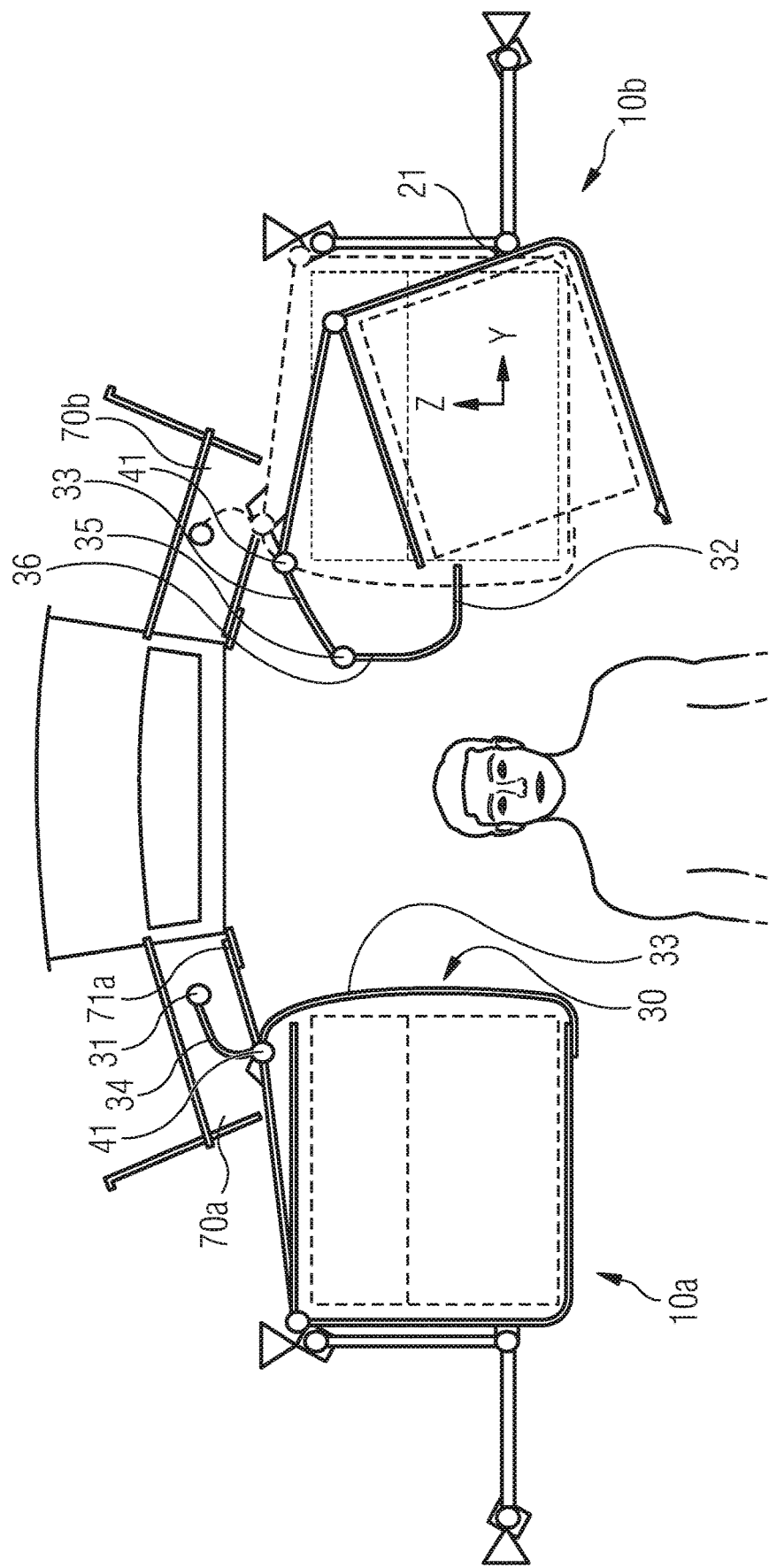
FIG. 8 diagrammatically shows the arrangement of two variants of a luggage locker in a vehicle cross section.

FIG. 8 diagrammatically shows the arrangement of two variants of a luggage locker 10 in a vehicle cross section. Here, a closed luggage locker 10a in accordance with the variant of FIG. 5 is arranged on the left-hand side in FIG. 8. Here, the upper section 34 of the front element 30 and the third holder 31 are arranged at least for the most part in a ceiling region 70a of the vehicle, and can be concealed by way of a corresponding top element 71a. Here, the top element 71a can be of flexible (elastic) configuration, in order to make the movement of the front element 30 possible without the production of openings in the ceiling region 70a of the vehicle.

The right-hand region of FIG. 8 shows a corresponding variant of a luggage locker 10b which is shown in the closed state (dashed line) and also in the open state (double line). For reasons of clarity, the upper section 34 of the front element 30 in the open state is not shown. In the variant of the luggage locker 10b, the front element 30 has a two-piece region between the fourth holder 41 and a side of the front element 30, which side faces the bottom 25. Here, a lower section 36 of the front element 30 is connected rotatably via a fifth holder 35 to an upper section 33 of the front element 30. As can be seen in FIG. 8, this allows pivoting of the lower region 36 of the front element 30 in the open state of the front element 30, with the result that the front element 30 takes up less space in the interior of the vehicle. In particular, a central ceiling region is not blocked by the front element, with the result that sufficient headroom for passengers remains in the case of a lower ceiling height of the vehicle interior.

Figure 9:
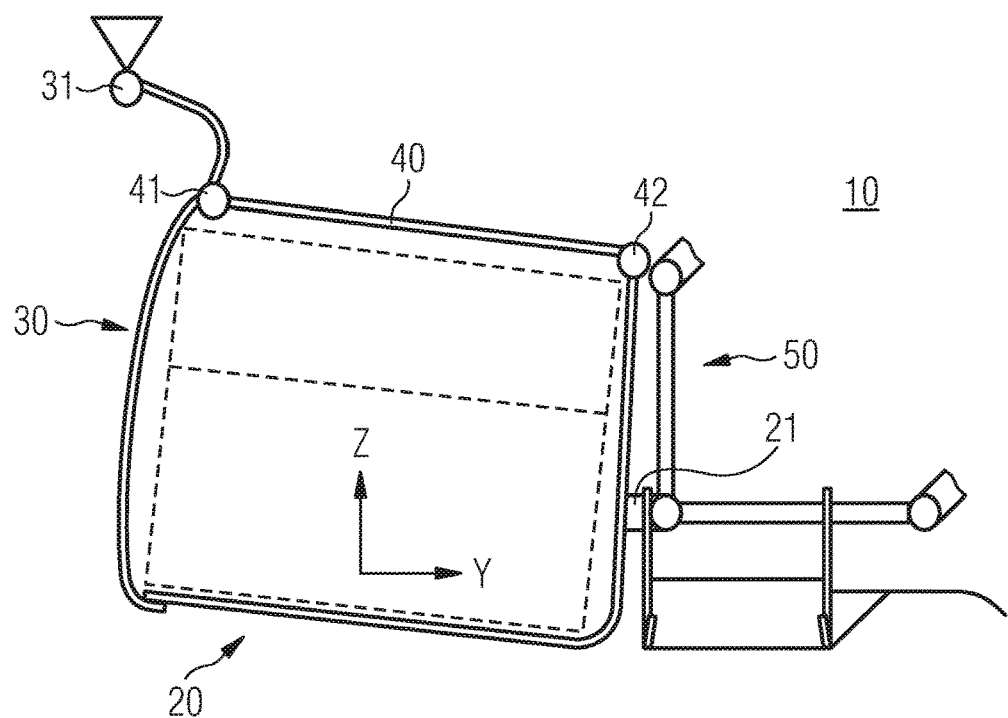
FIG. 9 diagrammatically shows a cross section of a further variant of a luggage locker in the closed state.
Figure 10:
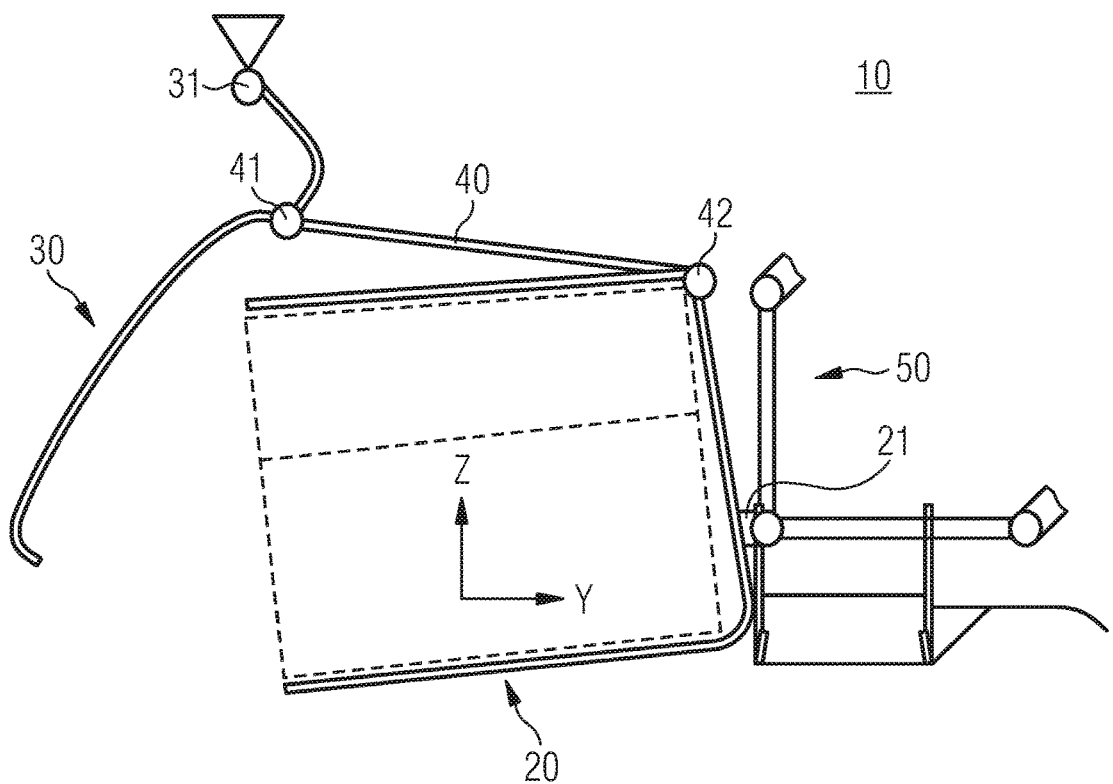
FIG. 10 diagrammatically shows a cross section of the variant from FIG. 9 in the open state.

FIGS. 9 and 10 show a further variant of a luggage locker 10 which has a front element 30 with a concave and convex course and, in the closed position of the front element 30, has a luggage compartment 20 which is tilted towards the rear. Therefore, the luggage compartment 20 which is tilted towards the rear corresponds to the variant in accordance with FIGS. 3 and 4, whereas the front element 30 with a concave and convex course corresponds to the variant from FIGS. 5 to 7. The remaining elements of the variant of the luggage locker 10 correspond to those from FIGS. 3 to 7 and will therefore not be described in greater detail.

FIG. 11 diagrammatically shows the arrangement of the variant of the luggage locker 10 from FIG. 9 in a vehicle cross section. In addition, a luggage locker 10c in accordance with the variant from FIG. 5 is shown in the closed position of the front element 30 in FIG. 11 on the left-hand side. The luggage locker 10c has a horizontally running bottom 25 in the closed position of the front element 30. In contrast, the luggage locker 10 which is shown on the right-hand side in FIG. 11 is inclined in the closed position of the front element 30, as shown in more detail in FIG. 9. As a comparison of the luggage lockers 10c, 10 which are shown on the left and on the right in FIG. 11 shows, the front edge of the bottom 25 and/or the end section 32 of the front element 30 are/is arranged at a higher level in the case of the right-hand luggage locker 10 than is the case in the left-hand luggage locker 10c. As a result, an enlarged interior of the vehicle can be achieved, as a result of which the front edge of the bottom 25 and/or the end section 32 of the front element 30 impede/impedes passengers in the vehicle to a lesser extent, and the view in the interior of the vehicle is also improved.

It can also be seen from FIG. 11 that the inclined arrangement of the luggage compartment 20 in the closed position of the front element 30 can also be adapted to the course of the structure of the vehicle in the ceiling region. The inclination in the closed position can thus correspond approximately to the inclination of the structure of the vehicle in the ceiling region. This makes a greatest possible utilization of the space which is available in the interior of the vehicle possible, as a result of which the interior which is available to the passengers is enlarged.

The luggage lockers 10 which are shown in FIGS. 3 to 11 are all shown in cross section, for which reason side walls of the luggage lockers 10 are not shown. It goes without saying that, in addition to the bottom 25, the rear wall 26 and the top element 27, the luggage compartment 20 can also have two side walls which extend between the bottom 25, the top element 27 and the rear wall 26. For example, the luggage compartment 20 can be produced in one piece including side walls of this type. A single-piece tub of this type can be produced simply, in particular, from lightweight plastic, for example by way of deep drawing and/or the use of a mould which defines the stowage space.

Finally, it is to be noted, in particular, that the above-described variants, refinements and exemplary embodiments serve merely to describe the claimed teaching, but do not restrict it to the variants, refinements and exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or is priority.

The invention claimed is:

1. A pivotable luggage locker for a vehicle, the luggage locker comprising:
    a luggage compartment comprising a bottom and a rear wall;
    a first holder attached on an outer side of the rear wall and configured to hold the luggage compartment rotatably;
    a second holder attached to the luggage compartment at a position above, relative to a direction of extension of the rear wall away from the bottom, the first holder; and
    an actuating mechanism comprising:
        a front element configured to at least partially close the luggage compartment on a side opposite the rear wall;
        a third holder, on which the front element is held rotatably;
        a fourth holder, which is attached on the front element on a side which faces the luggage compartment; and
        a connecting element connected between the second holder and the fourth holder,
        wherein the second and fourth holders are configured to hold the connecting element in each case rotatably; and
    wherein the actuating mechanism is coupled rotatably to the luggage compartment on the second holder, such that a rotation of the front element about the third holder causes the luggage compartment to rotate about the first holder.

2. The luggage locker according to claim 1, wherein:
    the first holder comprises a plurality of hinges attached on the outer side of the rear wall, or
    the first holder is configured in a form of one or more piano hinges and extends over substantially an entire width of the rear wall.

3. The luggage locker according to claim 1, wherein the third holder is fastened to a structural element of the vehicle.

4. The luggage locker according to claim 1, wherein the fourth holder is arranged on the front element such that a spacing between the third holder and the fourth holder is smaller than a spacing between the fourth holder and a side of the front element, which side faces the bottom.

5. The luggage locker according to claim 1, wherein the front element has an end section which faces the bottom, the end section being configured to engage under the bottom and to hold it in a positively locking manner in case of a rotational movement of the front element towards the luggage compartment.

6. The luggage locker according to claim 1, wherein:
    the front element extends substantially in one plane from the third holder to a side of the front element, which side faces the bottom, or
    the front element has a substantially concave configuration between the third holder and the fourth holder and a substantially convex configuration between the fourth holder and a side of the front element, which side faces the bottom.

7. The luggage locker according to claim 6, wherein the fourth holder is closer to the second holder than the third holder when the front element at least partially closes the luggage compartment on the side opposite the rear wall.

8. The luggage locker according to claim 1, wherein the front element has a two-piece configuration, comprising an upper section and a lower section, between the fourth holder and an end section of the front element, the upper section being connected to the lower section by a fifth holder.

9. The luggage locker according to claim 1, wherein:
    the third holder comprises a plurality of hinges, or
    the third holder is configured in a form of one or more piano hinges and extends over substantially an entire width of the front element.

10. The luggage locker according to claim 1, wherein each rotational axis of the holders extends substantially parallel to a plane formed by the bottom.

11. The luggage locker according to claim 1, wherein the luggage compartment comprises a top element that extends substantially parallel to the bottom and is attached to the rear wall.

12. The luggage locker according to claim 11, wherein the second holder is attached on the top element.

13. A vehicle having a luggage locker according to claim 1.

* * * * *